(12) United States Patent
Hong et al.

(10) Patent No.: US 12,443,347 B2
(45) Date of Patent: Oct. 14, 2025

(54) DATA STORING METHOD, MEMORY STORAGE DEVICE AND MEMORY CONTROLLER

(71) Applicant: Hefei Core Storage Electronic Limited, Anhui (CN)

(72) Inventors: Wan-Jun Hong, Anhui (CN); Jian Hu, Anhui (CN); Tsung-Lin Wu, Hsinchu (TW); Qi-Ao Zhu, Anhui (CN); Chong Peng, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 18/809,339

(22) Filed: Aug. 20, 2024

(65) Prior Publication Data

US 2025/0244879 A1 Jul. 31, 2025

(30) Foreign Application Priority Data

Jan. 25, 2024 (CN) .......................... 202410101915.5

(51) Int. Cl.
*G06F 3/06* (2006.01)

(52) U.S. Cl.
CPC .......... *G06F 3/0614* (2013.01); *G06F 3/0659* (2013.01); *G06F 3/0679* (2013.01)

(58) Field of Classification Search
CPC .... G06F 3/0619; G06F 3/0614; G06F 3/0659; G06F 3/0679; G06F 3/064; G06F 3/0653; G06F 3/0652; G06F 2212/7211; G06F 2212/1032; G06F 2212/1036; G06F 12/0246

See application file for complete search history.

(56) References Cited

U.S. PATENT DOCUMENTS 7,818,525 B1 * 10/2010 Frost ................... G06F 11/1072
                                                                        711/E12.001
9,229,854 B1 * 1/2016 Kuzmin ................ G06F 3/0679
9,811,288 B1 11/2017 Chen et al.
(Continued)

FOREIGN PATENT DOCUMENTS

| CN | 104732153 | 6/2015 |
|----|-----------|--------|
| CN | 106354651 | 1/2017 |

(Continued)

OTHER PUBLICATIONS

"Office Action of Taiwan Counterpart Application", issued on Apr. 9, 2025, p. 1-p. 6.

*Primary Examiner* — Khoa D Doan
(74) *Attorney, Agent, or Firm* — JCIPRNET (57) ABSTRACT

A data storing method, a memory storage device, and a memory controller are provided. The method includes: obtaining a plurality of program/erase counts and a plurality of program/erase period values of a plurality of physical erasing units in a storage area; calculating a plurality of data cold and hot degrees according to the plurality of program/erase counts and the plurality of program/erase period values; selecting a first physical erasing unit according to the plurality of data cold and hot degrees, and selecting a second physical erasing unit according to the plurality of data cold and hot degrees; and writing data stored in the first physical erasing unit to the second physical erasing unit.

18 Claims, 8 Drawing Sheets

(56) References Cited

U.S. PATENT DOCUMENTS

| | | | |
|---|---|---|---|
| 10,482,071 B1 | 11/2019 | Shalev | |
| 2011/0320688 A1* | 12/2011 | Lee | G06F 12/0246 |
| | | | 711/E12.008 |
| 2021/0056018 A1 | 2/2021 | Yen et al. | |
| 2022/0399066 A1 | 12/2022 | Chen et al. | |
| 2023/0019910 A1 | 1/2023 | Zhu et al. | |
| 2023/0036841 A1 | 2/2023 | Kim et al. | |
| 2023/0093247 A1* | 3/2023 | Kumar | G06F 3/0673 |
| | | | 711/154 |
| 2023/0185460 A1* | 6/2023 | Kim | G06F 3/0653 |
| | | | 711/105 |

FOREIGN PATENT DOCUMENTS

| | | |
|---|---|---|
| CN | 106951193 | 7/2017 |
| CN | 107122308 | 9/2017 |
| CN | 112748863 | 5/2021 |
| CN | 115793987 | 5/2023 |
| TW | 201351138 | 12/2013 |
| TW | 202006553 | 2/2020 |

\* cited by examiner

DATA STORING METHOD, MEMORY STORAGE DEVICE AND MEMORY CONTROLLER

CROSS-REFERENCE TO RELATED APPLICATION

This application claims the priority benefit of China application serial no. 202410101915.5, filed on Jan. 25, 2024. The entirety of the above-mentioned patent application is hereby incorporated by reference herein and made a part of this specification.

BACKGROUND

Technical Field

The disclosure relates to a memory storage technology, and particularly relates to a data storing method, a memory storage device, and a memory controller.

Description of Related Art

Since the limited erase lifetime of the memory module will directly affect the lifetime of the memory device, the Flash Translation Layer (FTL) is used to balance the program/erase counts of the physical erasing units (physical blocks) through the wear leveling (WL) mechanism. Generally speaking, wear leveling is to move the infrequently updated data (cold data) stored in the physical erasing units to the physical erasing units having higher program/erase counts, so that the usage counts of the physical erasing units having higher program/erase counts are reduced, and the physical erasing units having lower program/erase counts can be put into use (i.e., transferred from the idle area to the storage area).

However, in actual applications, users' usage behaviors are not static. That is to say, previously cold data may be transformed into frequently updated data (hot data) during subsequent use. As a result, the existing wear leveling mechanism not only fails to suppress the erase count (EC) difference, but makes the erase counts of the physical erasing units having higher program/erase counts increasingly higher, such that the lifetime of the memory storage device will be significantly reduced. In addition, ineffective wear leveling operations may also increase the write amplification factor (WAF) of the memory module.

SUMMARY

Embodiments of the disclosure provide a data storing method, a memory storage device, and a memory controller, which can optimize a wear leveling mechanism to improve the lifetime of the memory storage device.

An embodiment of the disclosure provides a data storing method for a memory storage device. The memory storage device includes a memory controller and a memory module. The memory module is divided into a storage area and an idle area. The data storing method includes: obtaining a plurality of program/erase counts and a plurality of program/erase period values of a plurality of physical erasing units in the storage area; calculating a plurality of data cold and hot degrees according to the plurality of program/erase counts and the plurality of program/erase period values; selecting a first physical erasing unit according to the plurality of data cold and hot degrees, and selecting a second physical erasing unit according to the plurality of data cold and hot degrees; and writing data stored in the first physical erasing unit to the second physical erasing unit.

An embodiment of the disclosure further provides a memory storage device, which includes a connection interface, a memory module, and a memory controller. The memory module is divided into a storage area and an idle area. The memory controller is connected to the connection interface and the memory module. The memory controller is configured to obtain a plurality of program/erase counts and a plurality of program/erase period values of a plurality of physical erasing units in the storage area. The memory controller is further configured to calculate a plurality of data cold and hot degrees according to the plurality of program/erase counts and the plurality of program/erase period values. The memory controller is further configured to select a first physical erasing unit according to the plurality of data cold and hot degrees, and select a second physical erasing unit according to the plurality of data cold and hot degrees. The memory controller is further configured to write data stored in the first physical erasing unit to the second physical erasing unit.

An embodiment of the disclosure further provides a memory controller, which is configured to control a memory module. The memory module is divided into a storage area and an idle area. The memory controller includes a host interface, a memory interface, and a memory control circuit. The host interface is configured to connect to a host system. The memory interface is configured to connect to the memory module. The memory control circuit is connected to the host interface and the memory interface. The memory control circuit is configured to obtain a plurality of program/erase counts and a plurality of program/erase period values of a plurality of physical erasing units in the storage area. The memory control circuit is further configured to calculate a plurality of data cold and hot degrees according to the plurality of program/erase counts and the plurality of program/erase period values. The memory control circuit is further configured to select a first physical erasing unit according to the plurality of data cold and hot degrees, and select a second physical erasing unit according to the plurality of data cold and hot degrees. The memory control circuit is further configured to write data stored in the first physical erasing unit to the second physical erasing unit.

Based on the above, the disclosure provides a data storing method, a memory storage device, and a memory controller, which can comprehensively consider the program/erase counts of the physical erasing unit and the interval periods from when the physical erasing units were last read or erased as the triggering conditions for wear leveling. That is, when selecting the physical erasing unit for wear leveling, the disclosure not only considers the number of program/erase counts, but also further introduces the concept of program/erase period value to improve the accuracy of hot and cold data determination.

In order to make the above-mentioned features and advantages of the disclosure clearer and easier to understand, the following embodiments are given and described in details with accompanying drawings as follows.

DESCRIPTION OF THE EMBODIMENTS

Reference will now be made in detail to present preferred embodiments of the disclosure, examples of which are illustrated in the accompanying drawings. Whenever possible, the same reference numbers are used in the drawings and the description to refer to the same or like parts.

Figure 1:
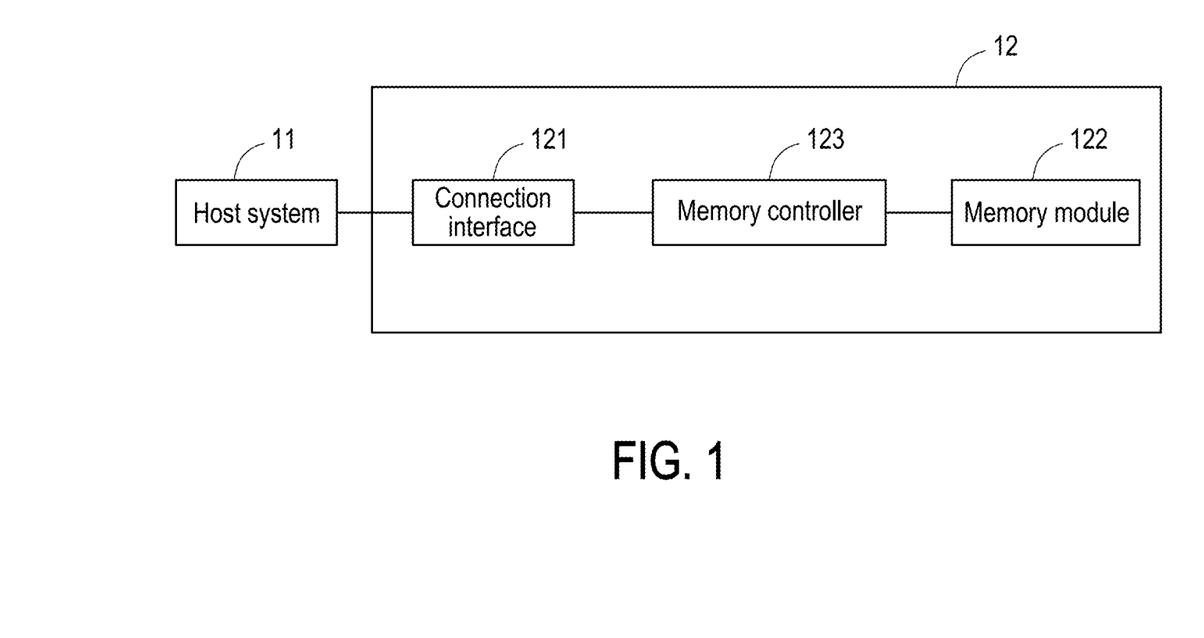
FIG. 1 is a schematic diagram of a memory storage device according to an embodiment of the disclosure.

FIG. 1 is a schematic diagram of a memory storage device according to an embodiment of the disclosure. Referring to FIG. 1, a memory storage system 10 includes a host system 11 and a memory storage device 12. The host system 11 may be any type of computer system. For example, the host system 11 may be a notebook computer, a desktop computer, a smart phone, a tablet computer, an industrial computer, etc. The memory storage device 12 is configured to store data from the host system 11. For example, the memory storage device 12 may include a solid-state drive, a USB flash drive, or other types of non-volatile storage devices. The host system 11 may be electrically connected to the memory storage device 12 via a Serial Advanced Technology Attachment (SATA) interface, a Peripheral Component Interconnect Express (PCI Express), a Universal Serial Bus (USB), or other types of connection interfaces. Thus, the host system 11 may store data to the memory storage device 12 and/or read data from the memory storage device 12.

The memory storage device 12 may include a connection interface 121, a memory module 122, and a memory controller 123. The connection interface 121 is configured to connect the memory storage device 12 to the host system 11. For example, the connection interface 121 may support connection interface standards such as SATA, PCI Express, or USB. The memory storage device 12 may communicate with the host system 11 via the connection interface 121.

The memory module 122 is configured to store data. The memory module 122 may include a rewritable non-volatile memory module. The memory module 122 includes a storage unit array. The storage units in the memory module 122 store data in the form of voltage. For example, the memory module 122 may include a single level cell (SLC) NAND flash memory module, a multi level cell (MLC) NAND flash memory module, a triple level cell (TLC) NAND flash memory module, quad level cell (QLC) NAND type flash memory module, or other memory modules with similar characteristics.

The memory controller 123 is connected to the connection interface 121 and the memory module 122. The memory controller 123 may be configured to control the memory storage device 12. For example, the memory controller 123 may control the connection interface 121 and the memory module 122 to perform data access and data management. For example, the memory controller 123 may include a central processing unit (CPU), a graphics processing unit (GPU) or other programmable general-purpose or special-purpose microprocessors, a digital signal processor (DSP), a programmable controller, an application specific integrated circuit (ASIC), a programmable logic device (PLD), or other similar devices, or a combination thereof.

In an embodiment, the memory controller 123 is also referred to as a flash memory controller. In an embodiment, the memory module 122 is also referred to as a flash memory module. The memory module 122 may receive a command sequence from the memory controller 123 and access data stored in the storage units according to the command sequence.

Figure 2:
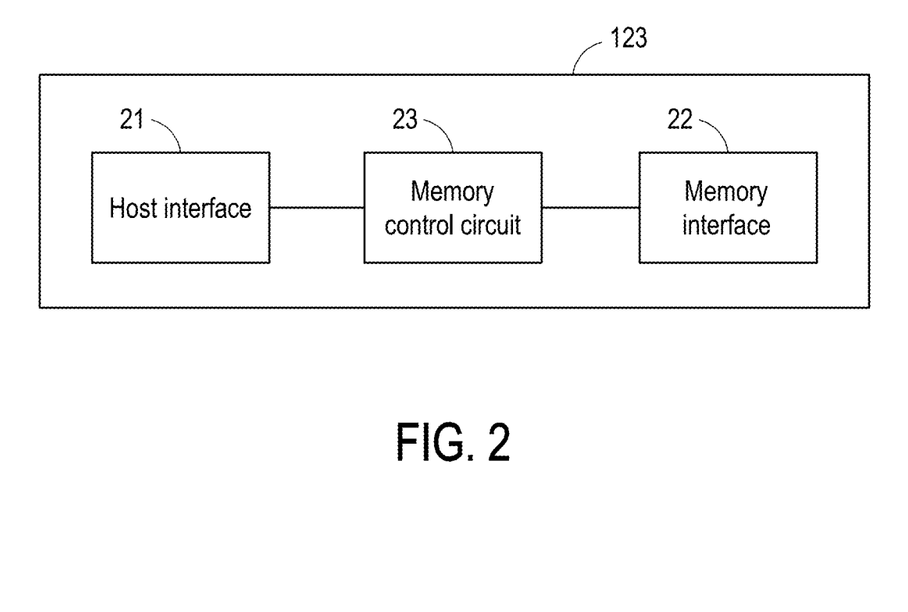
FIG. 2 is a schematic diagram of a memory controller according to an embodiment of the disclosure.

FIG. 2 is a schematic diagram of a memory controller according to an embodiment of the disclosure. Referring to FIG. 1 and FIG. 2, the memory controller 123 includes a host interface 21, a memory interface 22, and a memory control circuit 23. The host interface 21 is configured to connect to the host system 11 via the connection interface 121 to communicate with the host system 11. The memory interface 22 is configured to connect to the memory module 122 to communicate with the memory module 122.

The memory control circuit 23 is connected to the host interface 21 and the memory interface 22. The memory control circuit 23 may communicate with the host system 11 via the host interface 21 and access the memory module 122 via the memory interface 22. For example, the memory control circuit 23 may receive various operation commands (such as read commands, write commands, or erase commands) from the host system 11 via the host interface 21 and issue a corresponding command sequence (such as a read command sequence, a write command sequence, or an erase command sequence) to the memory module 122 via the memory interface 22. In addition, the memory control circuit 23 may transmit data to the host system 11 via the host interface 21. In an embodiment, the memory control circuit 23 may also be regarded as a control core of the memory controller 123. In the following embodiments, the description of the memory control circuit 23 is equivalent to the description of the memory controller 123.

Figure 3:
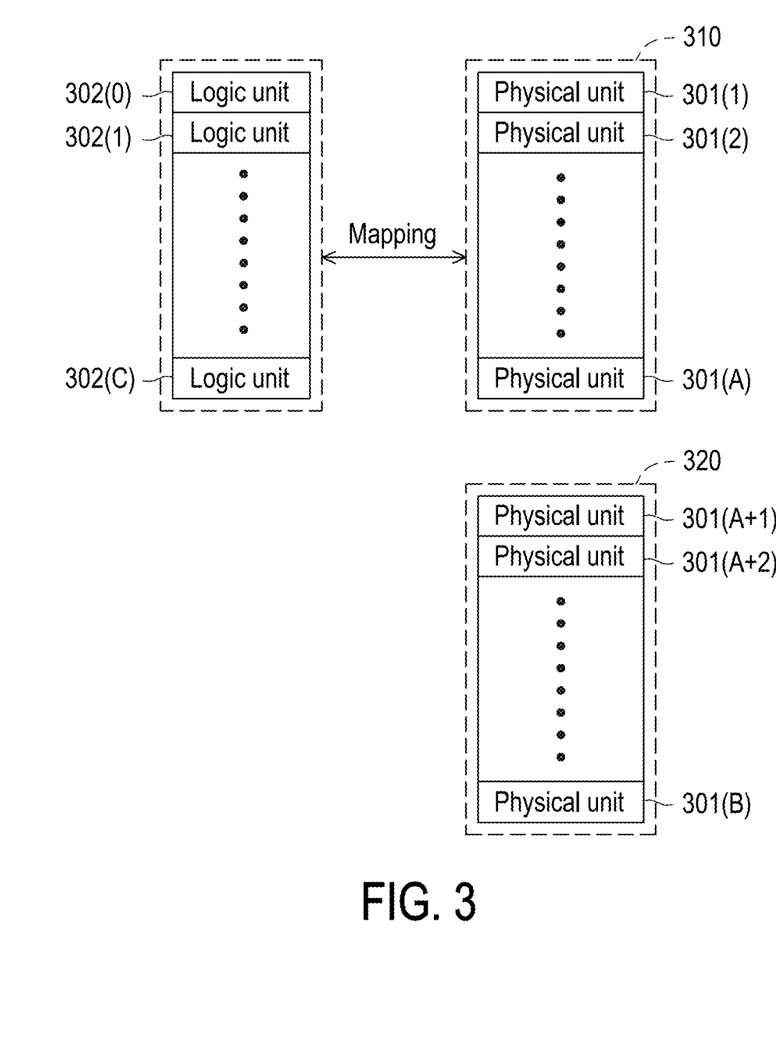
FIG. 3 is a schematic diagram of a management memory module according to an embodiment of the disclosure.

FIG. 3 is a schematic diagram of a management memory module according to an embodiment of the disclosure. Referring to FIG. 1 to FIG. 3, the memory module 122 includes a plurality of physical units 301(1) to 301(B). Each physical unit includes a plurality of storage units and is configured to store data in a non-volatile manner. For example, a physical unit may include one or more physical erasing units (e.g., physical blocks). Each physical unit may include a plurality of physical programming units (e.g., physical pages). A plurality of storage units in a physical page may be programmed simultaneously to store data. All storage units in a physical unit (or physical block) may be erased simultaneously.

In an embodiment, the physical units 301(1) to 301(A) and 301(A+1) to 301(B) in the memory module 122 may be divided into a storage area 310 and an idle area 320, respectively. The physical units 301(1) to 301(A) in the storage area 310 store data (also referred to as user data) from the host system 11. The physical units 301(A+1) to 301(B) in the idle area 320 do not store data.

In an embodiment, when new data from the host system 11 needs to be stored, one or more physical units in the idle area 320 will be selected and configured to store the new data. The physical units in the idle area 320 configured to store data may be divided into the storage area 310. As more and more physical units in the idle area 320 are configured to store data, the total number of physical units in the idle area 320 will gradually decrease.

In an embodiment, the memory control circuit 23 may configure a plurality of logical units 302(1) to 302(C) to map the physical units in the storage area 310. For example, a logical unit may consist of one or more logical addresses. For example, a logical address may include one or more logical block addresses (LBAs). The mapping relationship between the logical units and the physical units may be recorded in a logical-to-physical mapping table. When receiving an access command from the host system 11, the memory control circuit 23 may access the physical units in the storage area 310 and/or the idle area 320 according to the logical-to-physical mapping table.

In an embodiment, if a physical unit is currently mapped by a logical unit, it means that valid data is stored in the physical unit. However, if a certain physical unit is not currently mapped by any logical unit, it means that no valid data is stored in the physical unit.

In an embodiment, the memory control circuit 23 may obtain a plurality of program/erase counts and a plurality of program/erase period values of the plurality of physical units 301(1) to 301(A) in the storage area 310. Specifically, the plurality of program/erase period values may be configured to indicate the interval periods from when the physical units 301(1) to 301(A) were last read or erased.

Next, the memory control circuit 23 may calculate a plurality of data cold and hot degrees of the physical units (physical erasing units) 301(1) to 301(A) according to the plurality of program/erase counts and the plurality of program/erase period values, and perform a wear leveling operation according to the plurality of data cold and hot degrees.

Figure 4:
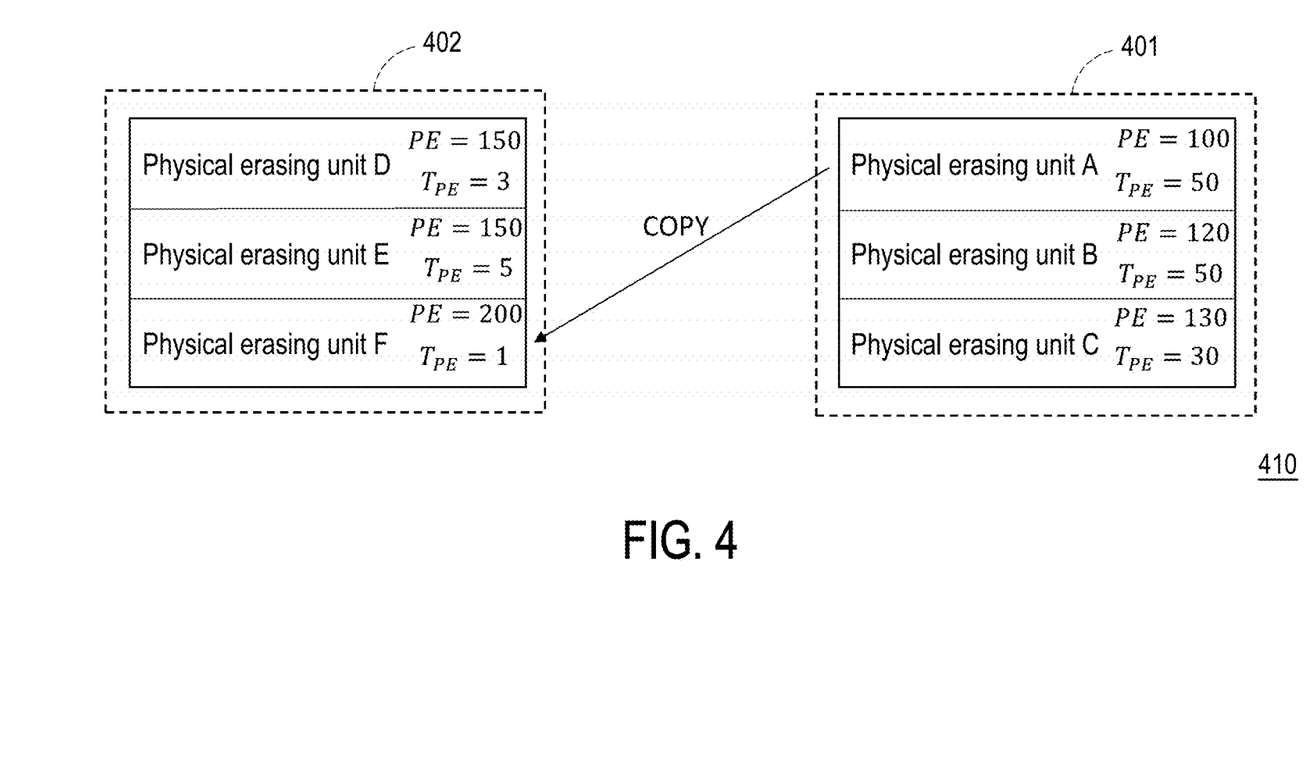
FIG. 4 is a schematic diagram of a storage area according to an embodiment of the disclosure.

FIG. 4 is a schematic diagram of a storage area according to an embodiment of the disclosure. Referring to FIG. 1, FIG. 2, and FIG. 4, a storage area 410 may also be divided into a valid area 401 and an invalid area 402. Taking FIG. 4 as an example, it is assumed that the storage area 410 has physical erasing units A to F. The physical erasing units A to C in the valid area 401 store valid data. The physical erasing units D to F in the invalid area 402 store invalid data.

In an embodiment, the memory control circuit 23 may obtain a plurality of program/erase counts and a plurality of program/erase period values of the physical erasing units A to F in the storage area 410. Specifically, the memory control circuit 23 may respectively divide a portion of the physical erasing units A to F to store the program/erase period values thereof. For example, the memory control circuit 23 may allocate 1 byte of capacity in each of the physical erasing units A to F to store the program/erase period values thereof. That is, if the memory module 122 has 1000 physical erasing units, the total capacity occupied by the program/erase period value is 1 KB.

In an embodiment, the program/erase period values may be configured to indicate the interval periods from when the physical erasing units A to F were last read or erased. Specifically, the memory control circuit 23 may preset the plurality of program/erase period values to zero. For example, when the memory module 122 is turned on, the program/erase period values of the physical erasing units A to F are preset to zero, so as to indicate the interval periods from when the physical erasing units A to F were last read or erased in subsequent operations.

In an embodiment, as shown in FIG. 4, the number of program/erase counts of the physical erasing unit A is 100, the number of program/erase counts of the physical erasing unit B is 120, the number of program/erase counts of the physical erasing unit C is 130, the number of program/erase counts of the physical erasing unit D is 150, the number of program/erase counts of the physical erasing unit E is 150, and the number of program/erase counts of the physical erasing unit F is 200. In addition, the program/erase period value of the physical erasing unit A is 50, the program/erase period value of the physical erasing unit B is 50, the program/erase period value of the physical erasing unit C is 30, the program/erase period value of the physical erasing unit D is 3, the program/erase period value of the physical erasing unit E is 5, and the program/erase period value of the physical erasing unit F is 1.

The memory control circuit 23 may calculate the plurality of data cold and hot degrees according to the plurality of program/erase counts and the plurality of program/erase period values. In an embodiment, the calculation formula for data cold and hot degrees is as follows:

$$K = \alpha * PE - \beta * T_{PE}$$

wherein, K is used to represent the data cold and hot degrees, PE is used to represent the number of program/erase counts, $T_{PE}$ is used to represent the program/erase period values, and $\alpha$ and $\beta$ are weight values. The values of $\alpha$ and $\beta$ may be designed according to actual usage conditions (e.g., user needs and/or user usage habits), and the disclosure is not limited thereto. In an embodiment, the values of $\alpha$ and $\beta$ are both 1. Therefore, the data cold and hot degrees of the physical erasing unit A is 50, the data cold and hot degrees of the physical erasing unit B is 70, the data cold and hot degrees of the physical erasing unit C is 100, the data cold and hot degrees of the physical erasing unit D is 147, the data cold and hot degrees of the physical erasing unit E is 145, and the data cold and hot degrees of the physical erasing unit F is 199.

Generally speaking, the lower the data cold and hot degrees of a physical erasing unit, the lower the data updating frequency of the physical erasing unit. Accordingly, the memory control circuit 23 may select a first physical erasing unit according to the plurality of data cold and hot degrees. Specifically, the memory control circuit 23 may select the first physical erasing unit having the lowest data cold and hot degrees from the valid area 401. That is, the memory control circuit 23 may select the physical erasing unit A having the lowest data cold and hot degrees (i.e., 50) as the first physical erasing unit. In an embodiment, the first physical erasing unit (i.e., physical erasing unit A) includes valid data.

In addition, the memory control circuit 23 may also select a second physical erasing unit according to the plurality of data cold and hot degrees. Specifically, the memory control circuit 23 may select the second physical erasing unit having the highest data cold and hot degrees from the invalid area 402. That is, the memory control circuit 23 may select the physical erasing unit F having the highest data cold and hot degrees (i.e., 199) as the second physical erasing unit. In an embodiment, the second physical erasing unit (i.e., physical erasing unit F) does not include valid data.

Next, the memory control circuit 23 may write the data stored in the first physical erasing unit (i.e., physical erasing unit A) to the second physical erasing unit (i.e., physical erasing unit F) to perform a wear leveling operation.

Figure 5:
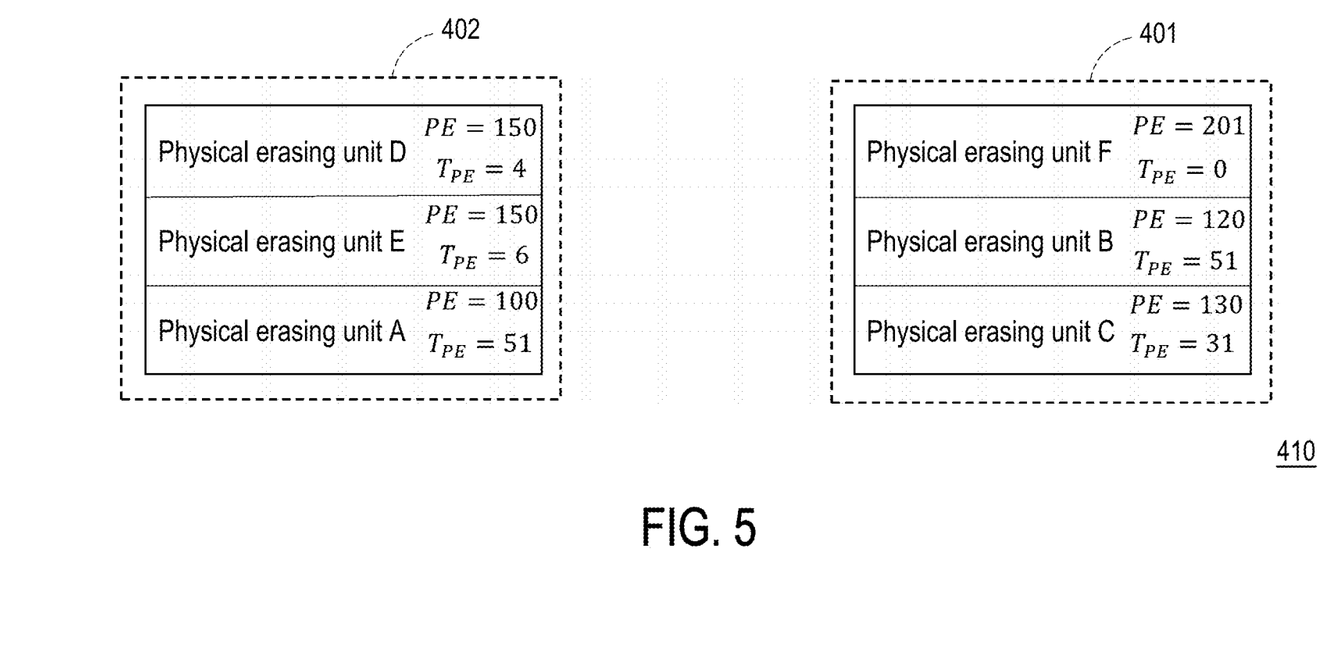
FIG. 5 is a schematic diagram of a storage area according to an embodiment of the disclosure.

As shown in FIG. 5, FIG. 5 is a schematic diagram of a storage area according to an embodiment of the disclosure. The memory control circuit 23 may write the data stored in the first physical erasing unit (physical erasing unit A) to the second physical erasing unit (physical erasing unit F). Accordingly, the physical erasing unit F is associated with the valid area 401, and the physical erasing unit A is associated with the invalid area 402.

The memory control circuit 23 may also reset the program/erase period value of the second physical erasing unit (physical erasing unit F) to zero, and increment the program/erase period values of the remaining physical erasing units by one. In detail, the program/erase period value of the physical erasing unit A is incremented to 51, the program/erase period value of the physical erasing unit B is incremented to 51, the program/erase period value of the physical erasing unit C is incremented to 31, the program/erase period value of the physical erasing unit D is incremented to 4, and the program/erase period value of the physical erasing unit E is incremented to 6. In addition, since the physical erasing unit F is written with the data stored in the physical erasing unit A, the program/erase period value of the physical erasing unit F is 0. In addition, the memory control circuit 23 may also increment the program/erase counts of the second physical erasing unit (physical erasing unit F) by one. That is to say, the number of program/erase counts of the physical erasing unit F is incremented to 201.

In this way, the memory control circuit 23 may comprehensively consider the program/erase counts of the physical erasing units A to F and the interval periods from when the physical erasing units A to F were last read or erased (i.e., program/erase period values) as the triggering conditions for wear leveling, so as to improve the lifetime of the memory storage device 12.

In an embodiment, after performing the above-mentioned wear leveling operation, it is assumed that the user changes his/her needs and/or usage habits. For example, the user overwrites the data in the physical erasing unit F (second physical erasing unit) through the host system 11. Since the physical erasing unit F stores data, the writing operation cannot be performed directly on the physical erasing unit F. Instead, a physical erasing unit having a smaller number of program/erase counts (i.e., physical erasing unit A) needs to be selected from the invalid area 402 to store data.

Please refer to FIG. 6 again, FIG. 6 is a schematic diagram of a storage area according to an embodiment of the disclosure. Since the logical address of the data newly written to the physical erasing unit A is the same as the logical address of the data stored in the physical erasing unit F, the data stored in the physical erasing unit F becomes invalid data. Accordingly, the physical erasing unit F is associated with the invalid area 402, the number of program/erase counts of the physical erasing unit A is incremented by one and the program/erase period value is reset to zero, and the program/erase period values of the remaining physical erasing units B to F are incremented by one.

Figure 6:
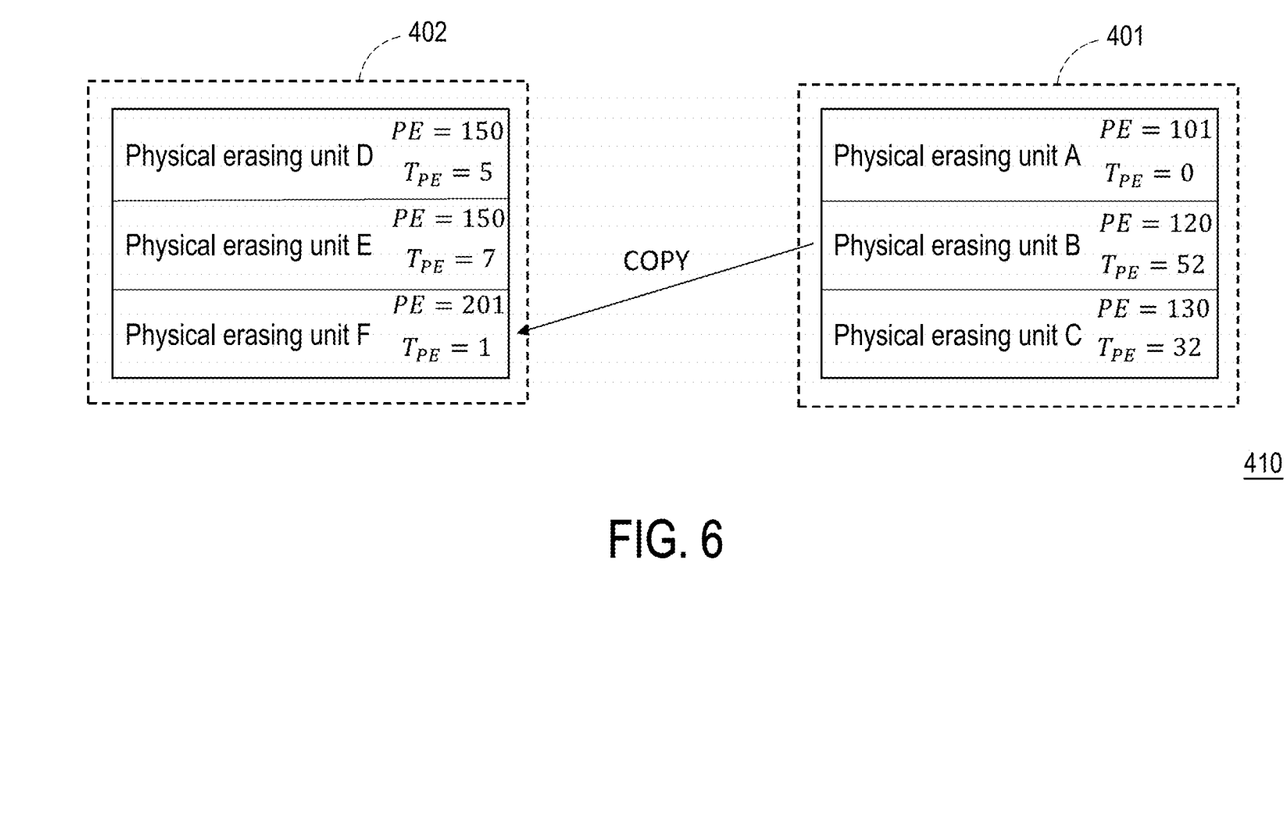
FIG. 6 is a schematic diagram of a storage area according to an embodiment of the disclosure.

At this time, if the memory control circuit 23 performs the wear leveling operation again, the method of the above embodiment may be used, where the memory control circuit 23 calculates the plurality of data cold and hot degrees of the physical erasing units A to F, and moves the data stored in the first physical erasing unit having the lowest data cold and hot degrees in the valid area 401 to the second physical erasing unit having the highest data cold and hot degrees in the invalid area 402, so as to perform a wear leveling operation.

As shown in FIG. 6, it is assumed that the values of α and β in the calculation formula for data cold and hot degrees are both 1. The data cold and hot degrees of the physical erasing units A to F calculated by the memory control circuit 23 are 101, 68, 98, 145, 143, and 200 respectively. Accordingly, the memory control circuit 23 may select the physical erasing unit B having the lowest data cold and hot degrees as the first physical erasing unit, and select the physical erasing unit F having the highest data cold and hot degrees as the second physical erasing unit.

Next, the memory control circuit 23 may write the data stored in the first physical erasing unit (physical erasing unit B) to the second physical erasing unit (physical erasing unit F). Specifically, referring to FIG. 7 again, FIG. 7 is a schematic diagram of a storage area according to an embodiment of the disclosure. The memory control circuit 23 may reset the program/erase period value of the second physical erasing unit (physical erasing unit F) to zero and increment the program/erase counts by one, and increment the program/erase period values of the remaining physical erasing units A to E by one.

Figure 7:
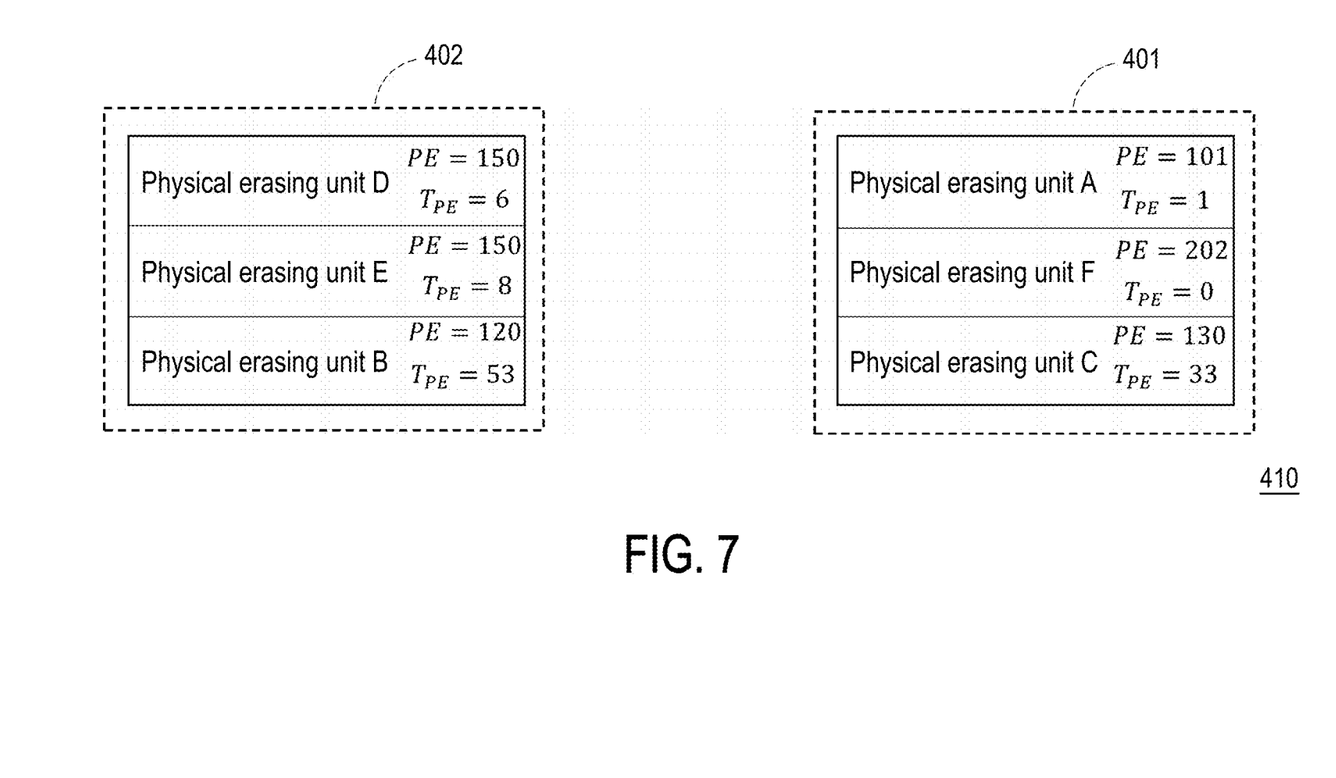
FIG. 7 is a schematic diagram of a storage area according to an embodiment of the disclosure.

In this way, the memory control circuit 23 may comprehensively consider the program/erase counts of the physical erasing units A to F and the interval periods from when the physical erasing units A to F were last read or erased (i.e., program/erase period values) as the triggering conditions for wear leveling, so as to avoid invalid wear leveling operations caused by changes in user needs and/or usage habits, avoid an increase in the write amplification factor, and improve the lifetime of the memory storage device 12.

Figure 8:
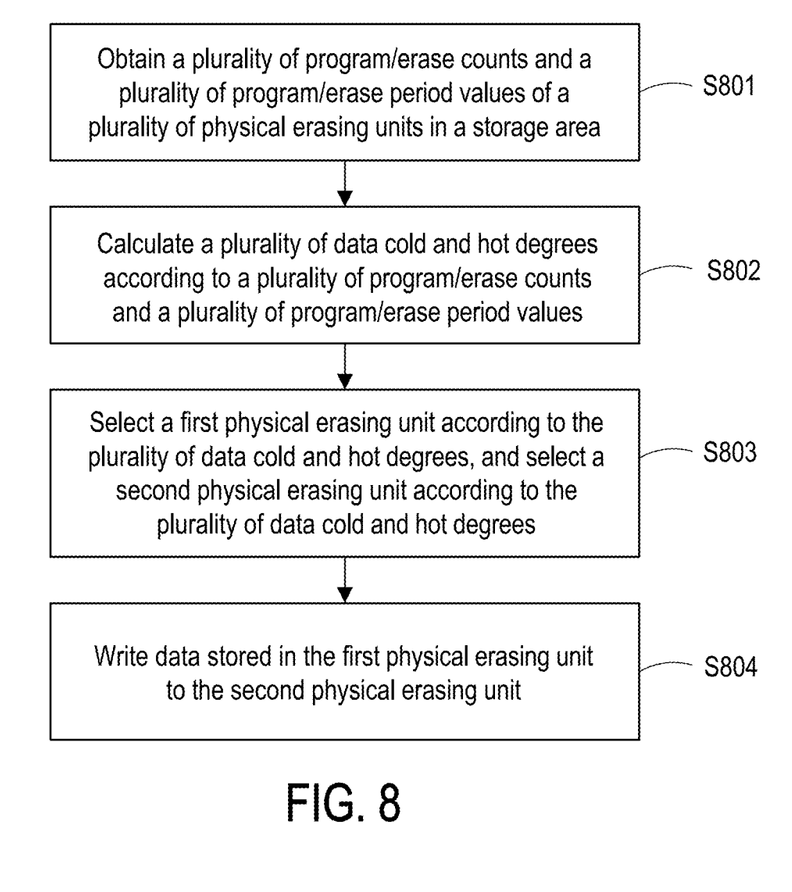
FIG. 8 is a flowchart of a data storing method according to an embodiment of the disclosure.

FIG. 8 is a flowchart of a data storing method according to an embodiment of the disclosure. Please refer to FIG. 8. In step S801, a plurality of program/erase counts and a plurality of program/erase period values of a plurality of physical erasing units in a storage area are obtained. In step S802, a plurality of data cold and hot degrees are calculated according to the plurality of program/erase counts and the plurality of program/erase period values. In step S803, a first physical erasing unit is selected according to the plurality of data cold and hot degrees, and a second physical erasing unit is selected according to the plurality of data cold and hot degrees. In step S804, data stored in the first physical erasing unit is written to the second physical erasing unit.

However, each step in FIG. 8 has been described in detail above and will not be repeated here. It should be noted that each step in FIG. 8 may be implemented as a plurality of program codes or circuits, and the disclosure is not limited thereto. In addition, the method of FIG. 8 may be used in conjunction with the above embodiments or may be used alone, and the disclosure is not limited thereto.

In summary, the disclosure provides the data storing method, the memory storage device, and the memory controller. When selecting the physical erasing unit for wear leveling, in addition to considering the number of program/erase counts, the concept of program/erase period value is further introduced to improve the accuracy of hot and cold data determination. In this way, the data storing method, the memory storage device, and the memory controller of the disclosure may avoid invalid wear leveling operations caused by changes in user needs and/or usage habits, and may avoid an increase in the write amplification factor, thereby effectively improving the lifetime of the memory storage device.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A data storing method for a memory storage device, wherein the memory storage device comprises a memory controller and a memory module, and the memory module is divided into a storage area and an idle area, the data storing method comprising:
obtaining a plurality of program/erase counts and a plurality of program/erase period values of a plurality of physical erasing units in the storage area;
calculating a plurality of data cold and hot degrees according to the plurality of program/erase counts and the plurality of program/erase period values;
selecting a first physical erasing unit according to the plurality of data cold and hot degrees, and selecting a second physical erasing unit according to the plurality of data cold and hot degrees; and
writing data stored in the first physical erasing unit to the second physical erasing unit.

2. The data storing method according to claim 1, further comprising:
resetting the program/erase period value of the second physical erasing unit to zero and incrementing the program/erase counts by one, and incrementing the program/erase period values of the remaining physical erasing units by one.

3. The data storing method according to claim 1, wherein the step of selecting the first physical erasing unit according to the plurality of data cold and hot degrees further comprises:
selecting the first physical erasing unit having a lowest data cold and hot degrees, wherein the first physical erasing unit comprises valid data.

4. The data storing method according to claim 1, wherein the step of selecting the second physical erasing unit according to the plurality of data cold and hot degrees further comprises:
selecting the second physical erasing unit having a highest data cold and hot degrees, wherein the second physical erasing unit does not comprise valid data.

5. The data storing method according to claim 1, wherein each of the program/erase period values is configured to indicate an interval period from when the corresponding physical erasing unit was last read or erased.

6. The data storing method according to claim 1, further comprising:
dividing a portion of each of the physical erasing units to store each of the program/erase period values, and presetting each of the program/erase period values to zero.

7. A memory storage device, comprising:
a connection interface, configured to connect to a host system;
a memory module, divided into a storage area and an idle area; and
a memory controller, connected to the connection interface and the memory module,
wherein the memory controller is configured to obtain a plurality of program/erase counts and a plurality of program/erase period values of a plurality of physical erasing units in the storage area,
the memory controller is further configured to calculate a plurality of data cold and hot degrees according to the plurality of program/erase counts and the plurality of program/erase period values,
the memory controller is further configured to select a first physical erasing unit according to the plurality of data cold and hot degrees, and select a second physical erasing unit according to the plurality of data cold and hot degrees, and
the memory controller is further configured to write data stored in the first physical erasing unit to the second physical erasing unit.

8. The memory storage device according to claim 7, wherein
the memory controller is further configured to reset the program/erase period value of the second physical erasing unit to zero and increment the program/erase counts by one, and increment the program/erase period values of the remaining physical erasing units by one.

9. The memory storage device according to claim 7, wherein
the memory controller is further configured to select the first physical erasing unit having a lowest data cold and hot degrees, wherein the first physical erasing unit comprises valid data.

10. The memory storage device according to claim 7, wherein
the memory controller is further configured to select the second physical erasing unit having a highest data cold and hot degrees, wherein the second physical erasing unit does not comprise valid data.

11. The memory storage device according to claim 7, wherein each of the program/erase period values is configured to indicate an interval period from when the corresponding physical erasing unit was last read or erased.

12. The memory storage device according to claim 7, wherein
the memory controller is further configured to divide a portion of each of the physical erasing units to store each of the program/erase period values, and preset each of the program/erase period values to zero.

13. A memory controller, configured to control a memory module, wherein the memory module is divided into a storage area and an idle area, the memory controller comprising:
a host interface, configured to connect to a host system;
a memory interface, configured to connect to the memory module; and
a memory control circuit, connected to the host interface and the memory interface,
wherein the memory control circuit is configured to obtain a plurality of program/erase counts and a plurality of program/erase period values of a plurality of physical erasing units in the storage area,
the memory control circuit is further configured to calculate a plurality of data cold and hot degrees according to the plurality of program/erase counts and the plurality of program/erase period values,
the memory control circuit is further configured to select a first physical erasing unit according to the plurality of data cold and hot degrees, and select a second physical erasing unit according to the plurality of data cold and hot degrees, and
the memory control circuit is further configured to write data stored in the first physical erasing unit to the second physical erasing unit.

14. The memory controller according to claim 13, wherein
the memory control circuit is further configured to reset the program/erase period value of the second physical erasing unit to zero and increment the program/erase counts by one, and increment the program/erase period values of the remaining physical erasing units by one.

15. The memory controller according to claim 13, wherein
the memory control circuit is further configured to select the first physical erasing unit having a lowest data cold and hot degrees, wherein the first physical erasing unit comprises valid data.

16. The memory controller according to claim 13, wherein
the memory control circuit is further configured to select the second physical erasing unit having a highest data cold and hot degrees, wherein the second physical erasing unit does not comprise valid data.

17. The memory controller according to claim 13, wherein each of the program/erase period values is configured to indicate an interval period from when the corresponding physical erasing unit was last read or erased.

18. The memory controller according to claim 13, wherein
the memory control circuit is further configured to divide a portion of each of the physical erasing units to store each of the program/erase period values, and preset each of the program/erase period values to zero.

* * * * *